United States Patent

Lee

[11] Patent Number: 6,044,001
[45] Date of Patent: Mar. 28, 2000

[54] ANODE CONTROLLER CIRCUIT FOR A TRAVELING WAVE TUBE

[75] Inventor: James Lee, Monterey Park, Calif.

[73] Assignee: Hughes Electronics Corporation, El Segundo, Calif.

[21] Appl. No.: 09/233,395

[22] Filed: Jan. 19, 1999

[51] Int. Cl.[7] .................................................... H02M 3/24
[52] U.S. Cl. .............................................. 363/97; 363/131
[58] Field of Search .............................. 363/15, 16, 95, 363/97, 131; 323/271, 282

[56] References Cited

U.S. PATENT DOCUMENTS

| | | | |
|---|---|---|---|
| 4,404,622 | 9/1983 | Cherry | 363/27 |
| 4,777,406 | 10/1988 | Ross et al. | 315/3.5 |
| 4,945,464 | 7/1990 | Gunn | 363/61 |
| 4,994,954 | 2/1991 | Katz et al. | 363/89 |
| 5,708,356 | 1/1998 | Onodera | 323/275 |

*Primary Examiner*—Matthew Nguyen
*Attorney, Agent, or Firm*—Georgann S. Grunebach; M. W. Sales

[57] ABSTRACT

A control circuit for a power supply for at least one Traveling Wave Tube (TWT) that uses the cathode voltage as a reference point allowing independent, variable control of each TWT. The cathode current is varied by varying the anode voltage. Therefore, it is not necessary to operate the TWT below maximum power at full cathode current. The result is improved operating efficiency for the TWT. A single power supply is capable of powering several TWT's resulting in a significant weight and cost savings for space applications.

8 Claims, 2 Drawing Sheets

ANODE CONTROLLER CIRCUIT FOR A TRAVELING WAVE TUBE

TECHNICAL FIELD

The present invention relates to a high voltage power supply for a Traveling Wave Tube (TWT) used in space applications, and more particularly, to a power supply for controlling the beam current of the TWT to vary the output power of the TWT.

BACKGROUND ART

Multiple TWTs are used on spacecraft and generally an individual power supply is associated with each TWT. The power supply delivers the necessary bias voltages and currents to the TWT that is essentially a high power amplifier. An example of a typical TWT with the basic requirements includes a filament, cathode, anode, collectors and helix. The filament voltage is applied first to preheat the filament. Once a predetermined temperature has been reached, the cathode, anode and collector voltages are applied. The helix is tied to ground potential.

In prior art TWTs the cathode current, or beam current, is controlled by the voltage difference between the cathode and the anode. The cathode current determines the maximum output power of the TWT. In the above example, the collector voltages are simply bias voltages.

Prior art power supplies for TWTs operate in two modes: ON or OFF. When operating in the ON mode, the maximum beam current is supplied, which allows the TWT to be driven to its maximum power. However, if the TWT is operated at less than maximum power, the power efficiency is reduced because of the fixed bias loss in the maximum setting of the beam current. Until the introduction of the present invention there has been no variable control of the TWT's beam current. If the beam current can be reduced for lower power applications, then the fixed bias loss is reduced thereby increasing overall efficiency. In space applications, TWTs are a major consumer of solar cell power because when they are ON they are running at full power. It is particularly advantageous to provide variable control of the TWT's output beam current in order to optimize a spacecraft's power budget.

Additionally, TWTs are generally powered from individual power supplies in order to achieve independent control. A significant weight and cost savings could be achieved by reducing the number of power supplies used in the space application. Independent ON/OFF control of multiple TWTs that are powered from a single power supply is highly desirable.

SUMMARY OF THE INVENTION

The present invention is a circuit for independent control of multiple TWTs powered by the same power supply. The present invention uses a separate beam controlling circuit for each TWT allowing it to be turned ON or OFF without interrupting the other TWTs.

In the control circuit of the present invention a reference voltage is tied to the cathode of the TWT which allows independent ON/OFF control of the TWTs and a wider operating range of cathode current than prior art control circuits.

It is an object of the present invention to power multiple TWTs from a single power supply. It is another object of the present invention to provide independent ON/OFF control of the TWTs.

It is yet another object of the present invention to provide variable power to the TWT without affecting the efficiency of a communication satellite using TWT power supplies. It is a further object of the present invention to reduce the size and cost, while improving the efficiency, of a spacecraft employing TWT power supplies.

Other objects and features of the present invention will become apparent when viewed in light of the detailed description of the preferred embodiment when taken in conjunction with the attached drawings and appended claims.

BRIEF DESCRIPTION OF THE DRAWINGS

FIG. 3 is a graph of the anode voltage, cathode voltage, and helix current of the TWT as it is turned on;

BEST MODES FOR CARRYING OUT THE INVENTION

Figure 1:
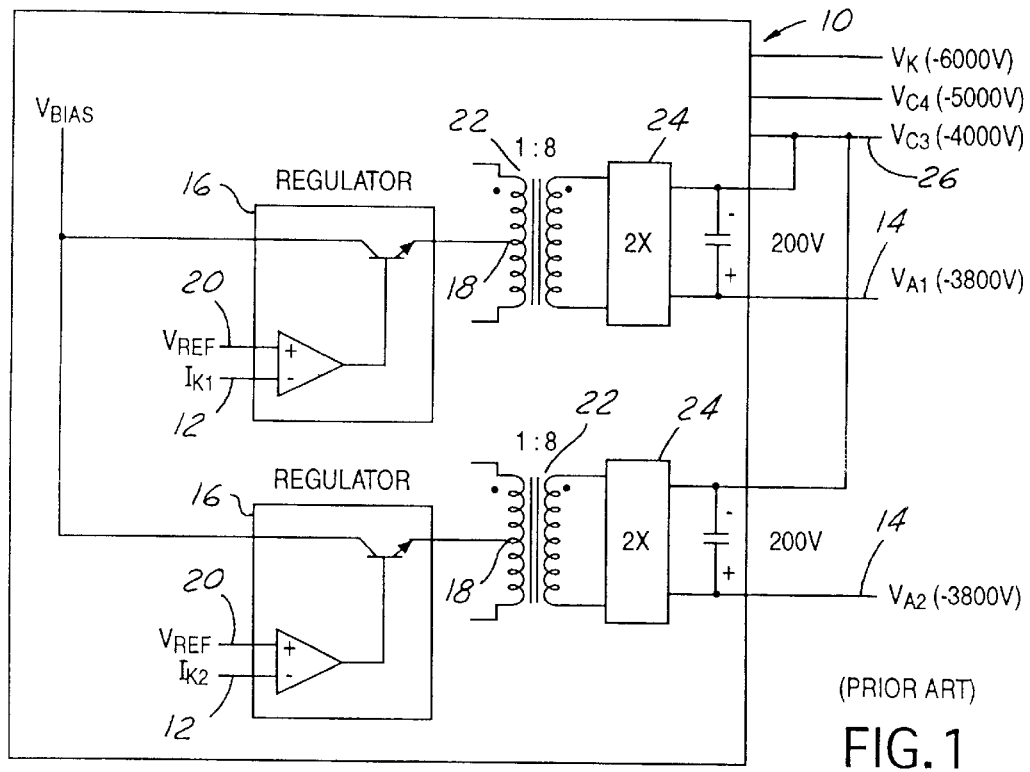
FIG. 1 is a schematic of a prior art circuit used to control cathode current of a TWT.

Referring to FIGS. 1 through 6, and in particular to FIG. 1, there is shown a prior art circuit 10 used to control cathode current 12 in a TWT. The cathode current 12, or beam current, is controlled by the voltage difference between the cathode and the anode of the TWT. In the example shown in FIG. 1, the control circuit 10 controls two TWT's (not shown). Therefore, there are two anode voltages 14 shown.

The anode voltage 14 is generated by setting a voltage regulator 16 to provide a regulated voltage 18 for a desired cathode current 12. A reference voltage 20 into the voltage regulator 16 will set the desired cathode current 12. The regulated voltage 18 is stepped up by a transformer 22 (eight times in the present example) and a diode doubler arrangement 24. The easiest way to generate the anode voltage is to use a collector voltage 26 that is closest in value to the anode voltage 14. In the example shown in FIG. 1, the collector voltage 26 is used as a reference point, merely because it is the voltage closest in value to the anode voltage 14.

The anode voltage 14 has limited range and therefore, the cathode current 12 variability is also limited. The range of the TWT's output power is limited which results in inefficiencies when the TWT is operated at lower power.

Figure 2:
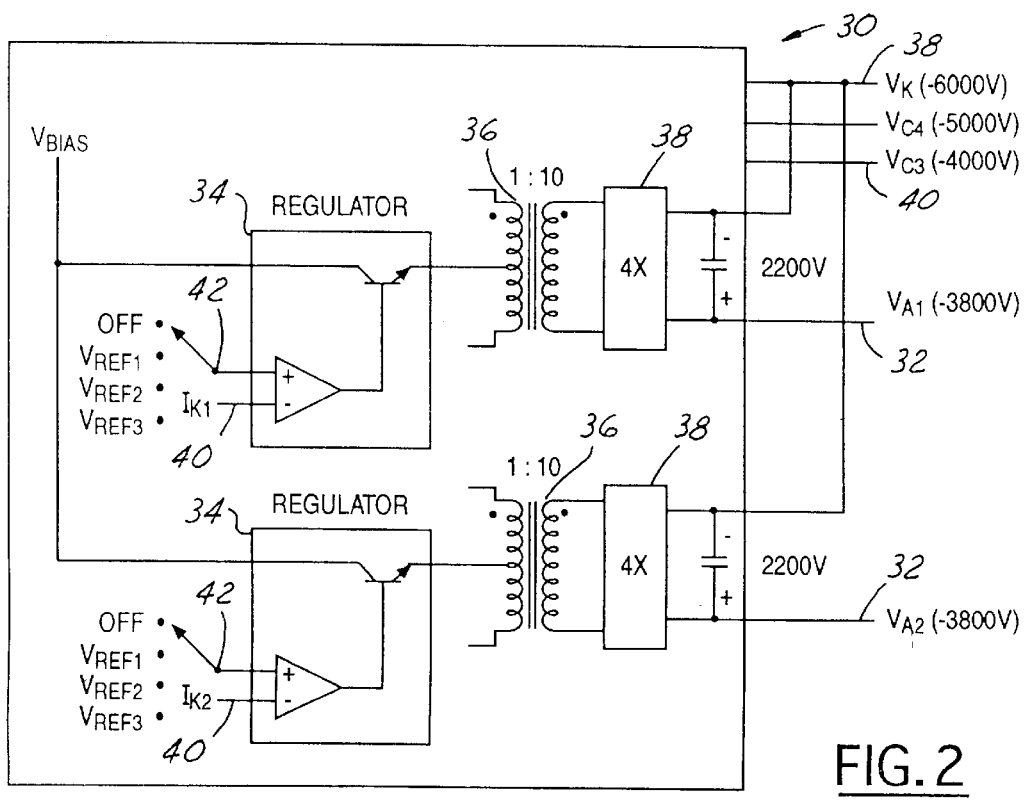
FIG. 2 is a schematic of the circuit of the present invention used to control cathode current of a TWT.

Referring to FIG. 2, a control circuit 30 of the present invention is shown. The anode voltage 32 is generated in much the same way as the circuit shown in FIG. 1. There is a voltage regulator 34 and a step up transformer 24. The step up transformer 36 has a larger ratio for reasons which will be explained in detail below. The diode arrangement 38 is doubled from the previous example to a four stage multiplier. This is also for reasons which will be explained in detail below.

The reference point in the circuit of the present invention is tied to the cathode voltage 38 and not the collector voltage 40 as in the prior example. This modification allows independent ON/OFF control of the TWT's and provides a much wider operating range of cathode current 40.

The cathode current 40 is a function of a perveance characteristic of the TWT and the difference between the cathode voltage 38 and the anode voltage 32. The perveance characteristic of the TWT is a constant, and the cathode voltage 40 is fixed. Therefore, the only way to vary the cathode current 40 is to vary the anode voltage 32. In the control circuit 30 of the present invention, the anode voltage 32 can vary from typically −3800 Volts to −6000 Volts, which varies the cathode current 40 from typically 0 to 80 mA. The anode voltage 32 is capable of being brought all the way up to the cathode voltage 38, which is the reason for the larger step up ratio in the transformer 36 and the larger multiplier diode arrangement 38 of the present invention.

The desired cathode current 40 is set by a variable reference voltage 42, allowing a greater range of variability in cathode current 40 than prior art control circuits. At 0 mA of cathode current 40, using the control circuit 30 of the present invention, the difference between the anode voltage 32 and the cathode voltage 38 is zero. The TWT is essentially OFF and draws little power. At 80 mA of cathode current, the TWT is biased to provide the maximum power. If only half of the output power is needed, the cathode current can be biased at 40 mA which minimizes the fixed losses. Because of the limited range of the prior art, it is not possible to vary the cathode current from 80 mA to 40 mA.

Figure 3:
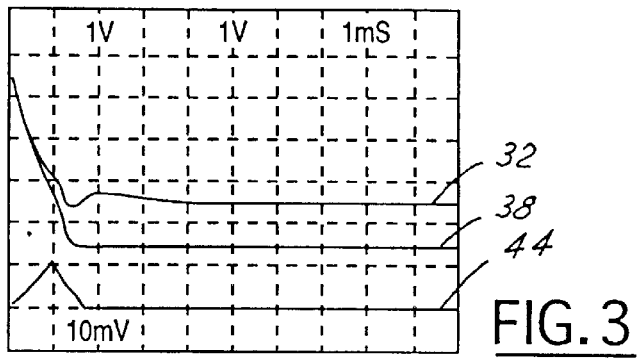

FIGS. 3 through 6 show the turn ON waveforms of the control circuit 30 of the present invention with a two TWT load. FIG. 3 shows the anode voltage 32, cathode voltage 38 and a helix current 44 as the TWT is turned on. The helix current 44 is monitored because it is a good indicator of TWT defocussing. Defocussing occurs when the cathode current 40 strikes the helix of the TWT, causing excessive helix current 44, typically greater than 50 mA. During transient conditions the helix current 44 should be kept at a minimum, in amplitude and duration, to prevent excessive stress on the helix. In FIG. 3, the peak helix current 44 is 10 mA, which is well below 50 mA.

Figure 4:
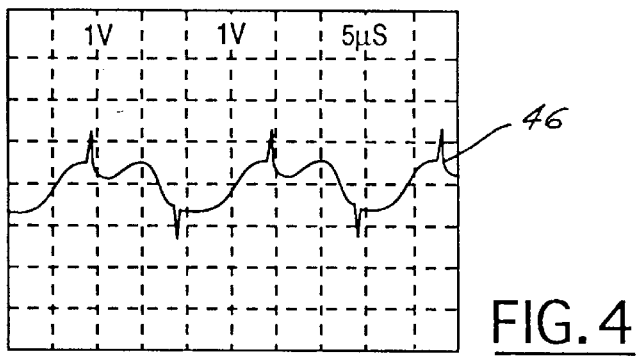
FIG. 4 is a graph of the anode ripple.

Because the anode voltage jumps from 200 Volts in the prior art control circuit 10 example shown in FIG. 1, to 2200 Volts in the control circuit 30 of the present invention, there is concern that excessive anode ripple 46 will occur. FIG. 4 shows the anode ripple 46 of the control circuit 30 of the present invention and that it is still reasonable.

Figure 5:
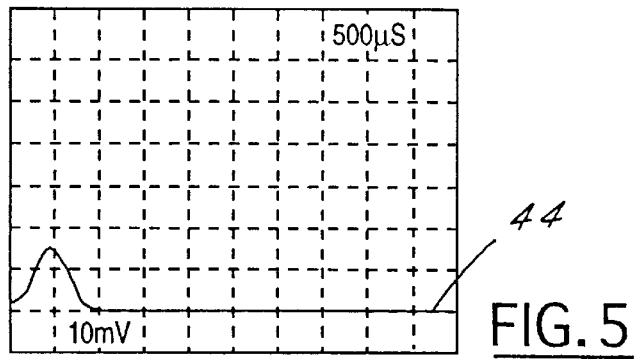
FIG. 5 is a graph of the helix current as the anode is switched ON with high voltage already present.
Figure 6:
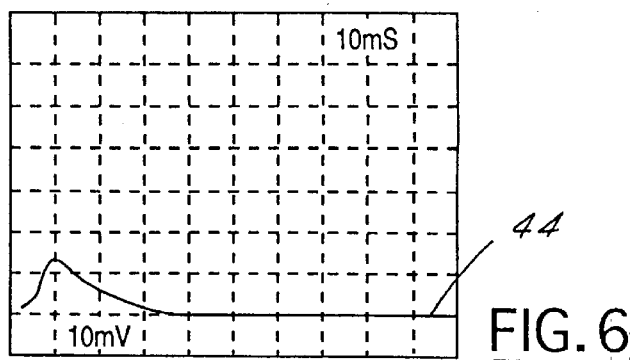
FIG. 6 is a graph of the helix current when the anode is switched OFF with high voltage already present.

FIGS. 5 and 6 are representative of the helix current 44 with one anode remaining ON while the other anode is turned ON (FIG. 5) and turned OFF (FIG. 6). Under such conditions, all of the bias voltages for the TWT that is ON, are already present for the TWT that is OFF. In turning ON and OFF the TWT with high voltage present, it is clear that the helix current 44 remains relatively low, typically 15 mA, under such conditions, showing that helix stress is not a concern for individually operating TWT's from the same power supply.

The present invention uses the cathode voltage 38 as a reference point in order to vary cathode current 40 by varying anode voltage 32 in order to allow independent TWT control for multiple TWTs powered by the same power supply. The variable anode voltage 32 also presents the opportunity for increased efficiency in TWT operation because there is no longer the need to operate at full beam current for lower power applications. In the control circuit 30 of the present invention, the cathode current 40 is varied as the anode voltage 32 is varied, thereby optimizing the power efficiency.

While a particular embodiment of the invention has been shown and described, numerous variations and alternate embodiments will occur to those skilled in the art. For example, it is possible to control a single TWT, or more than two TWTs from a single power supply using the control circuit of the present invention. Accordingly, it is intended that the invention be limited only in terms of the appended claims.

What is claimed is:

1. A control circuit for a power supply for at least one traveling wave tube having a cathode, at least one collector, and an independent anode, said control circuit for controlling a cathode current, said control circuit comprising:

a cathode voltage at said cathode of said at least one traveling wave tube, said cathode voltage being a constant voltage generated by said power supply;

a collector voltage at said at least one collector of said at least one traveling wave tube, said collector voltage generated by said power supply;

a regulated anode voltage at said independent anode, said regulated anode voltage generated by said power supply and further comprising:
a voltage regulator;
a step up voltage generator tied to said voltage regulator, said step up voltage generator having first and second outputs, said first output of said step up voltage generator tied to said independent anode of said at least one traveling wave tube, said second output of said step up voltage generator tied to said cathode for generating a voltage to said independent anode that is variable from said independent anode voltage to said cathode voltage;
whereby said cathode current is controlled by varying said anode voltage.

2. A control circuit as claimed in claim 1 wherein said voltage generator further comprises a step-up transformer and a diode multiplier arrangement.

3. A control circuit as claimed in claim 2 wherein said transformer is a 1 to 10 transformer and said diode multiplier arrangement further comprises a four stage multiplier.

4. A control circuit as claimed in claim 1 wherein said voltage regulator further comprises a variable reference voltage for setting a desired value for said cathode current.

5. A control circuit for a power supply for a plurality of traveling wave tubes, each of said plurality of traveling wave tubes having a cathode, and an independent anode for each of said plurality of traveling wave tubes, said control circuit for controlling a cathode current, said control circuit comprising:

a cathode voltage at said cathode, said cathode voltage being a constant voltage generated by said power supply;

a regulated anode voltage at said independent anode, said regulated anode voltage generated by said power supply and further comprising:
a voltage regulator;
a step up voltage generator tied to said voltage regulator, said step up voltage generator having first and second outputs, said first output of said step up voltage generator tied to said independent anode, said second output of said step up voltage generator tied to said cathode for generating a variable voltage to said independent anode;

whereby said cathode current is controlled by varying said anode voltage.

6. A control circuit as claimed in claim 5 wherein said voltage generator further comprises a step-up transformer and a diode multiplier arrangement.

7. A control circuit as claimed in claim 2 wherein said transformer is a 1 to 10 transformer and said diode multiplier arrangement further comprises a four stage multiplier.

8. A control circuit as claimed in claim 5 wherein said voltage regulator further comprises a variable reference voltage for setting a desired value for said cathode current.

* * * * *